US011962058B1

(12) United States Patent
Cai et al.

(10) Patent No.: US 11,962,058 B1
(45) Date of Patent: Apr. 16, 2024

(54) CIRCULAR FILTER ASSEMBLY

(71) Applicant: Chengdu Lingyi Communication Technology Co., Ltd., Sichuan (CN)

(72) Inventors: Wenxin Cai, Sichuan (CN); Yu Cao, Sichuan (CN); Yahui Hu, Sichuan (CN)

(73) Assignee: Chengdu Lingyi Communication Technology Co., Ltd., Sichuan (CN)

( * ) Notice: Subject to any disclaimer, the term of this patent is extended or adjusted under 35 U.S.C. 154(b) by 0 days.

(21) Appl. No.: 17/754,931

(22) PCT Filed: Jan. 29, 2022

(86) PCT No.: PCT/CN2022/074883
§ 371 (c)(1),
(2) Date: Apr. 15, 2022

(87) PCT Pub. No.: WO2022/199254
PCT Pub. Date: Sep. 29, 2022

(30) Foreign Application Priority Data

Mar. 22, 2021 (CN) ......................... 202110300212.1

(51) Int. Cl.
*H01P 1/38* (2006.01)
*H01P 1/20* (2006.01)
(Continued)

(52) U.S. Cl.
CPC .............. *H01P 3/16* (2013.01); *H01P 1/2002* (2013.01); *H01P 1/38* (2013.01); *H01P 1/39* (2013.01)

(58) Field of Classification Search
CPC .... H01P 1/38; H01P 1/39; H01P 1/383; H01P 1/32; H01P 1/36; H01P 1/2002;
(Continued)

(56) References Cited

U.S. PATENT DOCUMENTS 4,538,123 A 8/1985 Mariani
2014/0340165 A1* 11/2014 Kroening .................. H01P 1/38 333/1.1
2019/0036190 A1 1/2019 Feng et al.

FOREIGN PATENT DOCUMENTS

CN 104364962 2/2015
CN 110400993 11/2019
(Continued)

OTHER PUBLICATIONS

International Search Report issued for PCT/CN2022/074883 dated Apr. 20, 2022.

*Primary Examiner* — Stephen E. Jones
(74) *Attorney, Agent, or Firm* — Vedder Price P.C.

(57) ABSTRACT

Disclosed is a circular filter assembly, relating to the field of wireless communication. The circular filter assembly includes: a dielectric filter and a dielectric waveguide circulator. The dielectric waveguide circulator is provided with at least three end portions. An end of the dielectric filter is connected to one of the end portions. A cascade matching window is disposed at a connection between the dielectric filter and the end portion, and the cascade matching window is used for adjusting impedance of the circular filter assembly. The dielectric waveguide circulator and the dielectric filter are integrally formed. By integrally forming the dielectric waveguide circulator and the dielectric filter, connecting members between the dielectric waveguide circulator and the dielectric filter can be reduced. In addition, the cascade matching window is added to perform impedance adjustment, to obtain the same standing wave indicator as a conventional connection using a connector.

20 Claims, 4 Drawing Sheets

(51) Int. Cl.
*H01P 1/39* (2006.01)
*H01P 3/16* (2006.01)

(58) Field of Classification Search
CPC .......... H01P 1/2088; H01P 3/16; H01P 3/165; H01P 3/122
See application file for complete search history.

(56) References Cited

FOREIGN PATENT DOCUMENTS

| | | |
|---|---|---|
| CN | 10797613 | 2/2020 |
| CN | 112164848 | 1/2021 |
| CN | 113097674 | 7/2021 |

* cited by examiner

CIRCULAR FILTER ASSEMBLY

CROSS-REFERENCE TO RELATED APPLICATIONS

This application is a national phase entry under 35 USC § 371 of International Application PCT/CN2022/074883, filed on Jan. 29, 2022, which claims the benefit of and priority from China Application No. 2021103002121, filed on Mar. 22, 2021. The contents of each of the aforementioned patent applications are herein incorporated by reference in their entirety.

FIELD OF THE DISCLOSURE

The present application relates to the field of wireless communication, and more particularly, to a circular filter assembly.

BACKGROUND OF THE INVENTION

With the construction of global 5G base stations in full swing, the application of massive multiple-input multiple-output (MIMO) (multi-antenna arrays) and dielectric waveguide filters are gradually popularized in 5G base stations, and an active antenna unit (AAU, a device that integrates a remote radio frequency (RF) unit and an antenna) is a prominent feature in the 5G era. Under this system architecture with a minimal antenna mounting surface, a common layout of an RF front end is that arrays of antennas and arrays of filters are arranged in sequence, then each dielectric waveguide filter is connected to one port of a circulator by a connector, and the other two ports of the circulator are respectively connected to a transmitter and a receiver. The circulator is surface-mounted on a board of a transmit-receive (TR, RF) assembly (as shown in FIG. 1).

However, with this architecture, a dielectric waveguide filter and a circulator are interconnected by a connector to form a circular filter assembly, which increases a loss of the connector, leading to an increase in insertion loss of the circular filter assembly and the power consumption. In addition, the uncertainty at connections has a certain impact on the performance of the circular filter assembly.

BRIEF SUMMARY OF THE INVENTION

The present application is to at least solve one of technical problems in the existing technology. For this, a circular filter assembly is provided to reduce the insertion loss of the circular filter assembly and the power consumption.

A circular filter assembly according to embodiments of the present application includes: a dielectric filter, and a dielectric waveguide circulator. The dielectric waveguide circulator is provided with at least three end portions, where an end of the dielectric filter is connected to one of the end portions, a cascade matching window is disposed at a connection between the dielectric filter and the end portion and is used for adjusting impedance of the circular filter assembly, and the dielectric waveguide circulator and the dielectric filter are integrally formed.

According to the foregoing embodiments of the present application, the present application at least has the following beneficial effects: the dielectric waveguide circulator and the dielectric filter are integrally formed, so that connecting members between the dielectric waveguide circulator and the dielectric filter can be reduced. However, a standing wave indicator of the circular filter assembly obtained by integrating the dielectric filter and the dielectric waveguide circulator fails to meet a requirement. Therefore, the cascade matching window is added to perform impedance adjustment so as to meet the requirement of the standing wave indicator. In this case, compared with a conventional filter assembly obtained by connecting a circulator and a dielectric filter by a connector, the circular filter assembly of the present application has a smaller insertion loss and lower power consumption.

For the circular filter assembly in some embodiments of the present application, each of the other two end portions of the dielectric waveguide circulator is provided with a first feed blind hole, and the dielectric filter is provided with a second feed blind hole. The two first feed blind holes and the second feed blind hole are disposed on the same surface or different surfaces of the circular filter assembly. Therefore, by arranging the first feed blind hole and the second feed blind hole in a different manner, the circular filter assembly can be applied to a scenario in which an antenna is connected to one side and a TR assembly is connected to the other side, as well as to a scenario (that is, an AAU scenario) in which the entire circular filter assembly is directly soldered on a TR assembly board.

For the circular filter assembly in some embodiments of the present application, the dielectric filter includes two first resonant cavities, two second resonant cavities, a first T-shaped through groove, and a first coupling hole. The two first resonant cavities and the two second resonant cavities are respectively located at two ends of the dielectric filter, and the two second resonant cavities are located at an end away from the cascade matching window. The first T-shaped through groove includes a first through groove and a second through groove. The second through groove separates the two first resonant cavities. The first through groove separates the first resonant cavity and the second resonant cavity. An end of the second through groove is connected to the first through groove. The first coupling hole is located between the two second resonant cavities, and the same first surface of each of the first resonant cavity and the second resonant cavity is provided with a tuning blind hole. The circular filter assembly is provided with a second surface opposite to the first surface, and the second feed blind hole is located in the second surface. The first T-shaped through groove and the first coupling hole divide the dielectric filter into a plurality of first resonant cavities and second resonant cavities, to form a single-layer dielectric filter, so that the circular filter assembly has a uniform overall thickness to further facilitate mounting.

For the circular filter assembly in some embodiments of the present application, the dielectric filter further includes a second T-shaped through groove and two third resonant cavities. The second T-shaped through groove is located between the first T-shaped through groove and the first coupling hole. The second T-shaped through groove includes a third through groove and a fourth through groove. The third through groove and the first through groove are disposed in parallel. The fourth through groove and the second through groove are disposed in parallel. The fourth through groove is located between the two third resonant cavities. The third through groove is located between the third resonant cavity and the second resonant cavity.

For the circular filter assembly in some embodiments of the present application, second coupling holes are provided at two ends of the third through groove of the second T-shaped through groove.

For the circular filter assembly in some embodiments of the present application, an outer edge of each of the first feed blind hole and the second feed blind hole is provided with an electrode metal layer. The electrode metal layer is connected to a corresponding metallized area of the first feed blind hole or the second feed blind hole. By connecting the electrode metal layer to the metallized area of the feed blind hole, when solder pads on a PCB are connected by the electrode metal layer, the risk that the dielectric filter or the metallized area of the dielectric waveguide circulator comes into contact with the solder pads is reduced, and the solder pads can be in conduction with the feed blind hole by electrodes.

For the circular filter assembly in some embodiments of the present application, the electrode metal layer has a width set to 0.3 mm to 1 mm. Therefore, by setting the width of the electrode metal layer to 0.3 mm to 1 mm, the electrode metal layer can adapt to solder pad sizes of most existing PCBs.

For the circular filter assembly in some embodiments of the present application, the dielectric waveguide circulator is provided with a matching step and a mounting blind hole. The matching step is disposed on a surface of the dielectric waveguide circulator. The matching step is provided with a plurality of recesses provided corresponding to the end portions of the dielectric waveguide circulator. The recesses are circumferentially provided around the mounting blind hole. The mounting blind hole is used for mounting a magnetic assembly.

For the circular filter assembly in some embodiments of the present application, two adjacent recesses are in communication with each other. Since the recesses are in communication with each other, during processing, the matching step matching with an outer contour of the dielectric waveguide circulator may be first formed, and then the mounting blind hole is processed in the matching step, which increases the convenience in manufacture of the circular filter assembly.

For the circular filter assembly in some embodiments of the present application, the circular filter assembly further includes a magnetic assembly. The magnetic assembly includes a ferrite substrate, a samarium-cobalt magnet and a cover plate arranged sequentially. The cover plate is farther away from a bottom of the mounting blind hole with respect to the ferrite substrate. The cover plate is detachably disposed on the mounting blind hole. The samarium-cobalt magnet of the magnetic assembly can provide an external magnetic field, and the cover plate can provide a certain pressing force to the ferrite substrate and the samarium-cobalt magnet, to make the magnetic assembly better fixed in the mounting blind hole.

For the circular filter assembly in some embodiments of the present application, the dielectric waveguide circulator and the dielectric filter are obtained through integral formation by a dry pressing process or an injection process and then subjected to metallization.

The additional aspects and advantages of the present application are partially provided in the following description and partially become obvious from the following description or understood through the practice of the present application.

BRIEF DESCRIPTION OF DRAWINGS

The foregoing and/or additional aspects and advantages of the present application will be apparent and easily comprehensible from the description of the embodiments with reference to the accompanying drawings.

Figure 1:
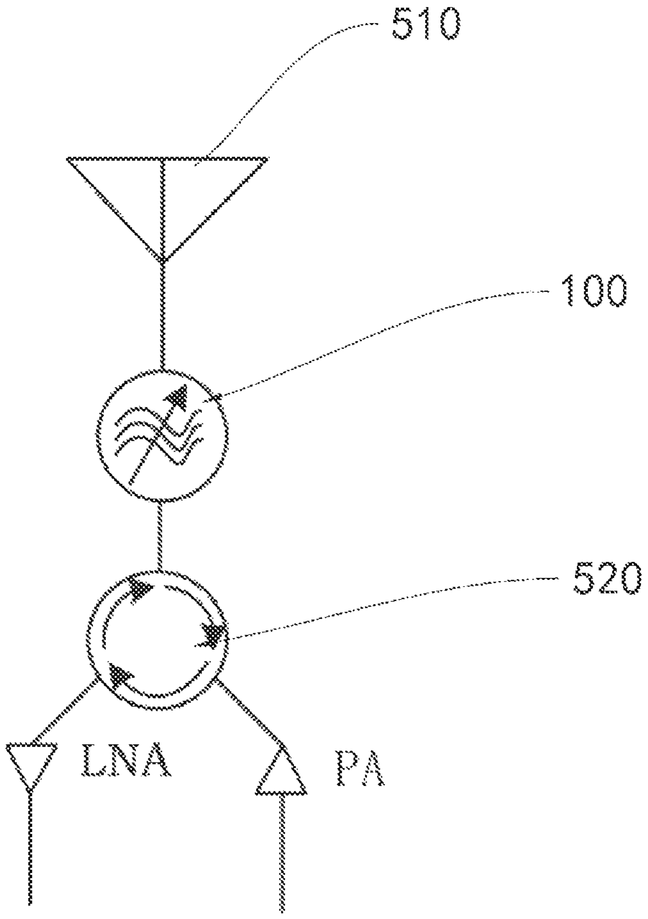
FIG. 1 is a schematic diagram of connection of a circular filter assembly in the existing technology.

REFERENCE NUMERALS dielectric filter 100, second feed blind hole 110, first T-shaped through groove 120, first through groove 121, second through groove 122, first coupling hole 130, tuning blind hole 140, second T-shaped through groove 150, third through groove 151, fourth through groove 152, second coupling hole 160, and first tuning blind hole 170;

dielectric waveguide circulator 200, end portion 210, first feed blind hole 220, electrode metal layer 230, non-metallized area 240, matching step 250, and mounting blind hole 260;

cascade matching window 300;

magnetic assembly 400, ferrite substrate 410, samarium-cobalt magnet 420, and cover plate 430; and antenna 510, and circulator 520.

DETAILED DESCRIPTION

The embodiments of the present application are described below in detail. Examples of the embodiments are shown in the accompanying drawings. The same or similar numerals represent the same or similar elements or elements having the same or similar functions throughout the specification. The embodiments described below with reference to the accompanying drawings are exemplary, and are only used to explain the present application but should not be construed as a limitation to the present application.

In the description of the present application, it needs to be understood that regarding the description of orientations, orientation or location relationships indicated by terms “up”, “down”, “front”, “rear”, “left”, and “right” are based on orientation or location relationships shown in the accompanying drawings, and are only used to facilitate description of the present application and simplify description, but are not used to indicate or imply that the apparatuses or elements must have specific orientations or are constructed and operated by using specific orientations, and therefore, cannot be understood as a limit to the present application.

In the description of the present application, unless otherwise expressly defined, the terms such as “disposed”, “mounted”, and “connected” should be understood in a broad sense. For persons of ordinary skill in the art, specific meanings of the terms in the present application may be appropriately determined with reference to the specific content in the technical solution.

With the construction of global 5G base stations in full swing, the application of massive MIMO and dielectric waveguide filters are gradually popularized in 5G base stations, and an AAU is a prominent feature in the 5G era. Under this system architecture with a minimal antenna mounting surface, as shown in FIG. 1, a common layout of an RF front end is that arrays of filters are arranged behind arrays of antennas 510, and then each dielectric waveguide filter 100 is connected to one port of a circulator 520 by a connector, and the other two ports of the circulator 520 are respectively connected to a transmitter and receiver. The circulator 520 is attached on a board of a TR assembly.

However, with this architecture, because the dielectric waveguide filter 100 and the circulator 520 are interconnected by a connector, which increases a loss of the connector, the overall insertion loss and the power consumption of the device are increased. In addition, the connector also has an uncertain impact on the performance of the circular filter assembly formed by the dielectric waveguide filter and the circulator 520.

Therefore, to solve the foregoing problem, the present application provides a circular filter assembly having the dielectric filter 100 and the dielectric waveguide circulator 200 integrally formed, so that the circular filter assembly does not have the insertion loss of a connector, leading to a reduced overall loss of a wireless device and optimized layout of a wireless system.

Figure 2:
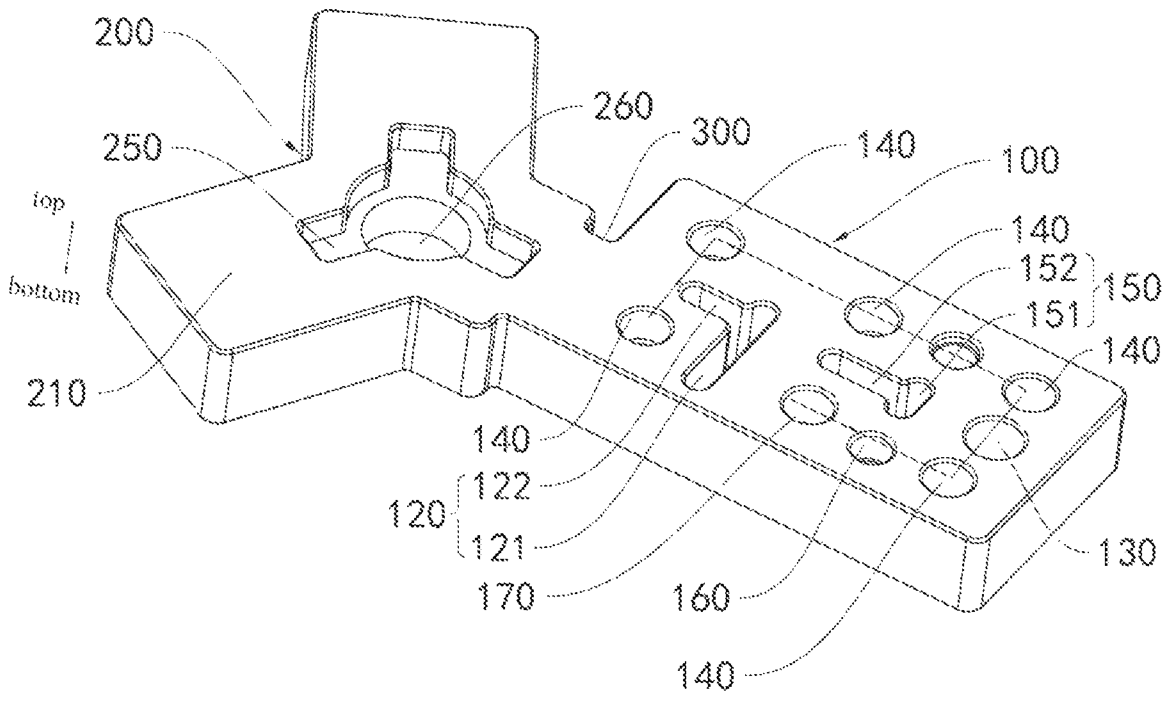
FIG. 2 is a schematic structural diagram of an embodiment of a circular filter assembly according to an embodiment of the present application (a magnetic assembly is not included, and a first feed blind hole and a second feed blind hole are provided in the same surface)

As shown in FIG. 2, the circular filter assembly of the present application includes: a dielectric filter 100 and a dielectric waveguide circulator 200. The dielectric waveguide circulator 200 is provided with at least three end portions 210. An end of the dielectric filter 100 is connected to one of the end portions 210. A cascade matching window 300 is disposed at a connection between the dielectric filter 100 and the end portion 210. The cascade matching window 300 is used for adjusting impedance of the circular filter assembly. The dielectric waveguide circulator 200 and the dielectric filter 100 are integrally formed.

Therefore, by integrally forming the dielectric waveguide circulator 200 and the dielectric filter 100, connecting members between the dielectric waveguide circulator 200 and the dielectric filter 100 can be reduced. However, a standing wave indicator of the circular filter assembly obtained by integrating the dielectric filter 100 and the dielectric waveguide circulator 200 fails to meet a requirement. Therefore, the cascade matching window 300 is added to perform impedance adjustment to obtain a standing wave indicator meeting a requirement. In this case, compared with a conventional filter assembly obtained by connecting the dielectric waveguide circulator 200 and the dielectric filter by a connector, the circular filter assembly of the present application not only satisfies the performances required, but also has a smaller insertion loss and lower power consumption.

It needs to be noted that the dielectric filter 100 and the dielectric waveguide circulator 200 are integrated by a dielectric material (the dielectric material may be, for example, ceramic powder) and then subjected to metallization. It needs to be noted that because the dielectric waveguide circulator 200 and the dielectric filter 100 are integrally formed, it is not necessary to use a device such as a connector to connect the dielectric waveguide circulator 200 and the dielectric filter, which further reduces the cost of the circular filter assembly.

It needs to be noted that the cascade matching window 300 is a recess, and impedance adjustment can be performed by adjusting the depth and width of the recess.

It needs to be noted that during simulated design, the waveguide circulator 200 and the dielectric filter 100 may be first separately simulated, and then a port of each of the two devices is integrated for cascaded simulation. Meanwhile, the cascade matching window 300 is adjusted to improve an impedance change of the integrated circular filter assembly, so as to improve the standing wave indicator of the circular filter assembly, thereby obtaining a circular filter assembly satisfying a requirement.

In this case, it may be understood that the dielectric waveguide circulator 200 and the dielectric filter 100 are obtained through integral formation by a dry pressing process or an injection process and then subjected to metallization.

Figure 3:
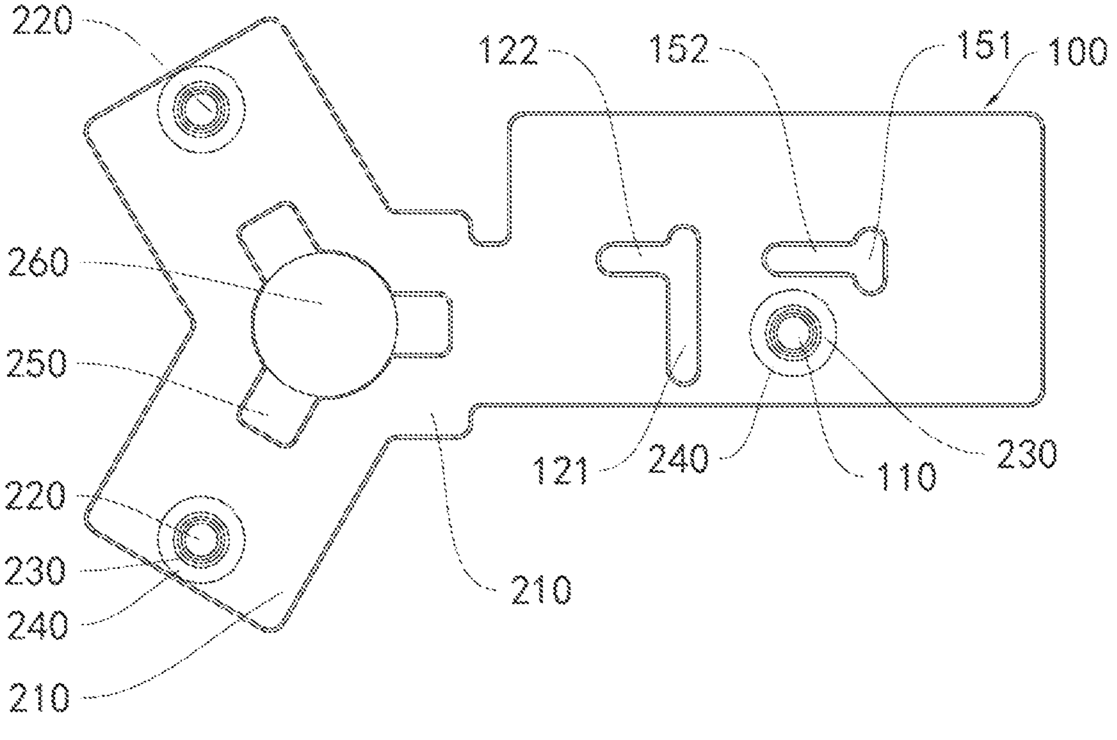
FIG. 3 is a top view of a lower surface of an embodiment of a circular filter assembly according to an embodiment of the present application.
Figure 5:
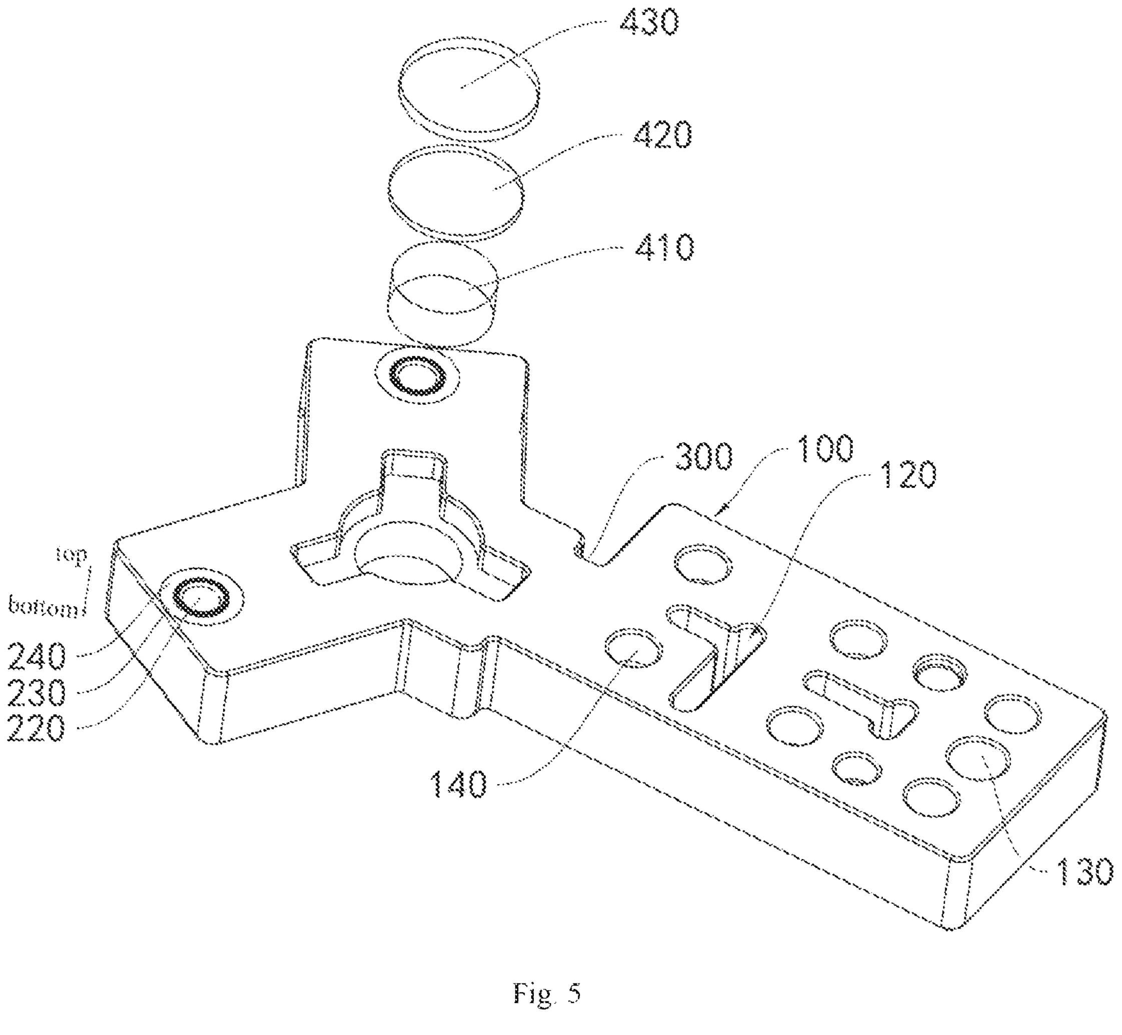
FIG. 5 is a schematic structural diagram of another embodiment of a circular filter assembly according to an embodiment of the present application (a first feed blind hole and a second feed blind hole are provided in different surfaces).

It may be understood that as shown in FIG. 2, FIG. 3, and FIG. 5, each of the other two end portions 210 of the dielectric waveguide circulator 200 is provided with a first feed blind hole 220, and the dielectric filter 100 is provided with a second feed blind hole 110. The two first feed blind holes 220 and the second feed blind hole 110 are disposed on the same surface (as shown in FIG. 2 and FIG. 3) or different surfaces (respectively located on an upper surface and a lower surface of the circular filter assembly shown in FIG. 5) of the circular filter assembly. Therefore, by arranging the first feed blind hole 220 and the second feed blind hole 110 in a different manner, the circular filter assembly can be applied to a scenario in which an antenna 510 is connected to one side and a TR assembly is connected to the other side, as well as to a scenario (that is, an AAU scenario) in which the entire circular filter assembly is directly soldered on a TR assembly board.

It needs to be noted that as shown in FIG. 2 and FIG. 3, when the first feed blind hole 220 and the second feed blind hole 110 are both provided in the same lower surface, in an AAU scenario, the thickness of the entire assembled AAU can be reduced by a thickness of one interconnection structure.

It may be understood that as shown in FIG. 2, the dielectric filter 100 includes two first resonant cavities, two second resonant cavities, a first T-shaped through groove 120, and a first coupling hole 130. The two first resonant cavities and the two second resonant cavities are respectively located at two ends of the dielectric filter 100. The two second resonant cavities are located at an end away from the cascade matching window 300. The first T-shaped through groove 120 includes a first through groove 121 and a second through groove 122. The second through groove 122 separates the two first resonant cavities. The first through groove 121 separates the first resonant cavity and the second resonant cavity. An end of the second through groove 122 is connected to the first through groove 121. The first coupling hole 130 is located between the two second resonant cavities. The same first surface (that is, the upper surface of the circular filter assembly shown in FIG. 2) of each of the first resonant cavity and the second resonant cavity is provided with a tuning blind hole 140. The circular filter assembly is provided with a second surface (that is, the lower surface of the circular filter assembly shown in FIG. 2) opposite to the first surface. The second feed blind hole 110 is located in the second surface. The first T-shaped through groove 120 and the first coupling hole 130 divide the dielectric filter 100 into a plurality of first resonant cavities and second resonant cavities, to form a single-layer dielectric filter 100, so that the circular filter assembly has a uniform overall thickness to further facilitate mounting.

It needs to be noted that when the dielectric filter has only two second resonant cavities and two first resonant cavities, the second feed blind hole 110 is located in the lower surface (that is, the second feed blind hole 110 and the first tuning blind hole 170 are respectively located in the lower surface and the upper surface of the second resonant cavity) of the second resonant cavity. When the dielectric filter 100 is provided with other resonant cavities, the second feed blind hole 110 is located in a lower surface of another resonant cavity adjacent to the first resonant cavity in the lower surface of the circular filter assembly.

It needs to be noted that all the tuning blind holes 140 in the dielectric filter 100 are located in the same surface of the dielectric filter 100. Therefore, the dielectric filter 100 in the present application is a single-layer dielectric filter 100.

It needs to be noted that the size of the first through groove 121 and distances between two ends of the first through groove 121 and a connection with the second through groove 122 may be adjusted according to a simulation result of the dielectric filter 100.

It may be understood that the dielectric filter 100 further includes a second T-shaped through groove 150 and two third resonant cavities. The second T-shaped through groove 150 is located between the first T-shaped through groove 120 and the first coupling hole 130. The second T-shaped through groove 150 includes a third through groove 151 and a fourth through groove 152. The third through groove 151 and the first through groove 121 are disposed in parallel. The fourth through groove 152 and the second through groove 122 are disposed in parallel. The fourth through groove 152 is located between the two third resonant cavities. The third through groove 151 is located between the third resonant cavity and the second resonant cavity.

It needs to be noted that as shown in FIG. 2, in this case, the second feed blind hole 110 is located in the lower surface of the third resonant cavity.

It needs to be noted that a plurality of groups of the second T-shaped through groove 150 and the two third resonant cavities may be provided. The plurality of groups of the second T-shaped through groove 150 and the two third resonant cavities are all disposed between the first T-shaped through groove 120 and the first coupling hole 130. When a plurality of second T-shaped through grooves 150 are provided, the second feed blind hole 110 is located in a lower surface of a third resonant cavity closest to the first T-shaped through groove 120. The third through groove 151 separates two adjacent third resonant cavities.

As shown in FIG. 2, when a signal enters the second feed blind hole 110 from an antenna, the signal travels in a direction indicated by the arrow in FIG. 2. In this case, the signal is inputted through one third resonant cavity in which the first tuning blind hole 170 is located, and sequentially passes through the second resonant cavity and the other third resonant cavity to be outputted to the dielectric waveguide circulator 200. When the signal passes through the dielectric waveguide circulator 200 to the dielectric filter 100, in this case, the travel direction of the signal is opposite to the arrow in FIG. 2, and the signal is outputted from the third resonant cavity in which the first tuning blind hole 170 is located.

It may be understood that the second coupling holes 160 are provided at two ends of the third through groove 151 of the second T-shaped through groove 150.

It may be understood that an outer edge of each of the first feed blind hole 220 and the second feed blind hole 110 is provided with an electrode metal layer 230. The electrode metal layer 230 is connected to a corresponding metallized area of the first feed blind hole 220 or the second feed blind hole 110. By connecting the electrode metal layer 230 to the metallized area of the feed blind hole, when solder pads on a PCB are connected by the electrode metal layer 230, the risk that the dielectric filter 100 or the metallized area of the dielectric waveguide circulator 200 contacts the solder pads is reduced, and the solder pads can be in conduction with the feed blind hole by electrodes.

It may be understood that the electrode metal layer 230 may has a width set to 0.3 mm to 1 mm. Therefore, by setting the width of the electrode metal layer 230 to 0.3 mm to 1 mm, the electrode metal layer can adapt to solder pad sizes of most existing PCBs.

It needs to be noted that "0.3 mm to 1 mm" includes 0.3 mm, 1 mm, and values between 0.3 mm to 1 mm.

It needs to be noted that the second feed blind hole 110 is a cylindrical groove body with an opening at one end. Therefore, the metallized area of the second feed blind hole 110 may be understood as a groove body side surface and a bottom surface of the cylindrical groove body.

It needs to be noted that a non-metallized area 240 is further disposed at an outer edge of the electrode metal layer 230 to further reduce the risk that the dielectric filter 100 or the dielectric waveguide circulator 200 contacts a PCB.

It may be understood that the dielectric waveguide circulator 200 is provided with a matching step 250 and a mounting blind hole 260. The matching step 250 is disposed on a surface of the dielectric waveguide circulator 200. The matching step 250 is provided with a plurality of recesses provided corresponding to the end portions of the dielectric waveguide circulator 200. The recesses are circumferentially provided around the mounting blind hole 260. The mounting blind hole 260 is used for mounting a magnetic assembly 400.

It may be understood that two adjacent recesses are in communication with each other. Since the recesses are in communication with each other, during processing, the matching step 250 matching with an outer contour of the dielectric waveguide circulator 200 may be first formed, and then the mounting blind hole 260 is processed in the matching step 250, which increases the convenience in manufacture the circular filter assembly.

It needs to be noted that the magnetic assembly 400 is conductive. Therefore, the bottom and sides of the mounting blind hole 260 are both insulating.

It needs to be noted that when each of the upper surface and the lower surface of the dielectric waveguide circulator 200 is provided with the matching step 250, compared with a scenario in which only one surface of the dielectric waveguide circulator 200 is provided with the matching step 250, the depth of the matching step 250 is smaller.

Figure 4:
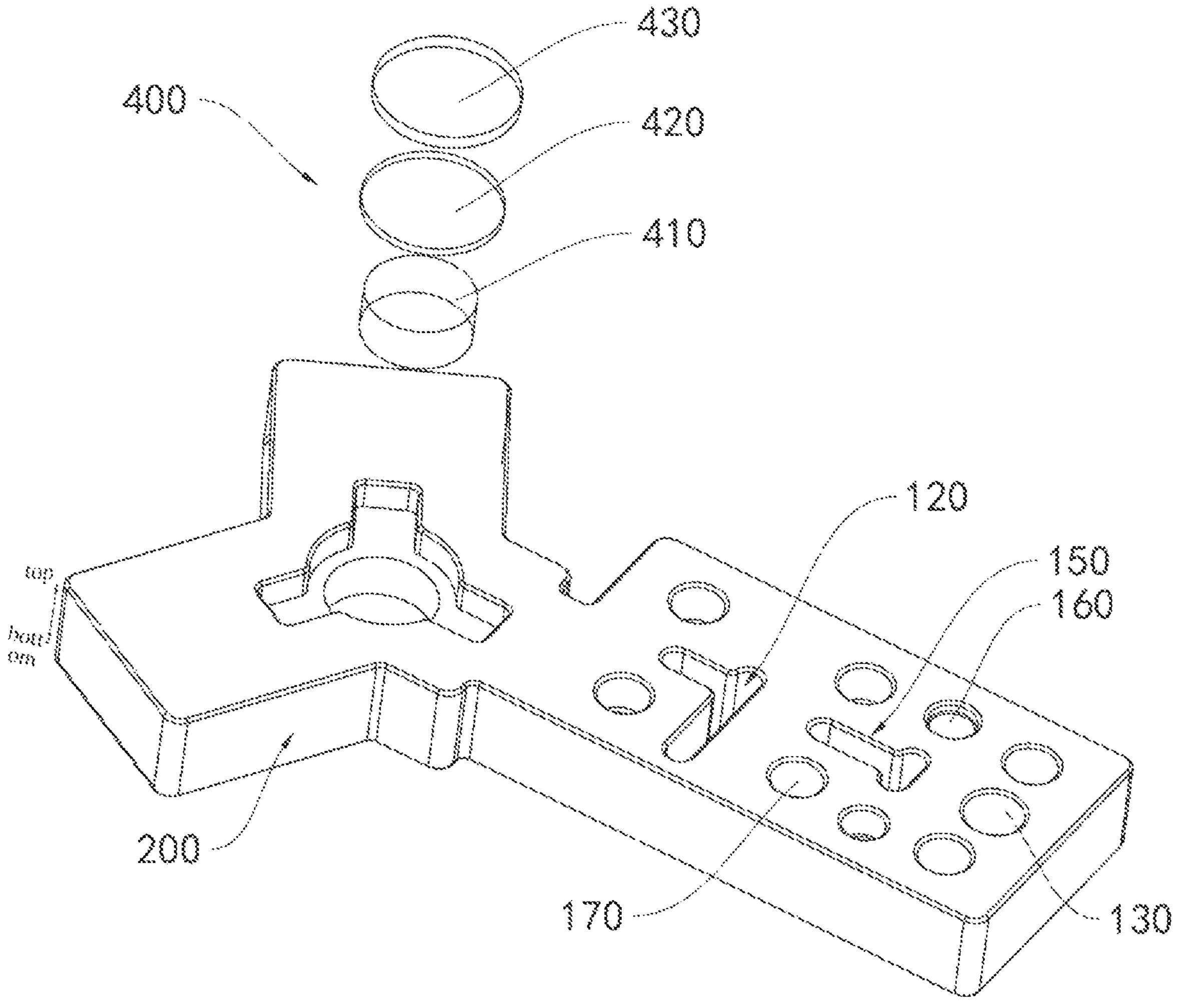
FIG. 4 is a schematic structural diagram of an embodiment of a circular filter assembly according to an embodiment of the present application (a schematic exploded view of a magnetic assembly is provided)

It may be understood that as shown in FIG. 4, the circular filter assembly further includes a magnetic assembly 400. The magnetic assembly 400 includes a ferrite substrate 410, a samarium-cobalt magnet 420 and a cover plate 430 arranged sequentially. The cover plate 430 is farther away from a bottom of the mounting blind hole 260 with respect to the ferrite substrate 410. The cover plate 430 is detachably disposed on the mounting blind hole 260. The samarium-cobalt magnet 420 of the magnetic assembly 400 can provide an external magnetic field. The cover plate 430 can provide a certain pressing force to the ferrite substrate 410 and the samarium-cobalt magnet 420, to make the magnetic assembly 400 better fixed in the mounting blind hole 260.

It needs to be noted that when the dielectric waveguide circulator 200 is provided with one matching step 250, the thickness of the ferrite substrate 410 needs to be set greater than when two matching steps 250 are provided. The specific thickness and depth of the matching step 250 may be set according to a result of simulation.

It needs to be noted that the cover plate 430 may be fixed on the mounting blind hole 260 in a clamping manner. After fixation, the cover plate 430 and the mounting blind hole 260 may be further fixed by glue or through soldering.

The circular filter assembly in the embodiments of the present application is described below in detail with reference to FIG. 2 to FIG. 4 by way of a specific embodiment. It is to be understood that the following description is only illustrative rather than limiting the present application.

As shown in FIG. 2, the circular filter assembly of the present application includes: a dielectric filter 100 and a dielectric waveguide circulator 200. The dielectric waveguide circulator 200 is provided with three end portions 210. An end of the dielectric filter 100 is connected to one of the end portions 210. A cascade matching window 300 is disposed at a connection between the dielectric filter 100 and the end portion 210. The cascade matching window is used for adjusting impedance of the circular filter assembly. The dielectric waveguide circulator 200 and the dielectric filter 100 are integrally formed.

Specifically, the dielectric filter 100 and the dielectric waveguide circulator 200 are integrally formed by using a dielectric material obtained after metallizing a ceramic powder material in combination with an injection process.

As shown in FIG. 2 and FIG. 3, each of the other two end portions 210 of the dielectric waveguide circulator 200 is provided with a first feed blind hole 220. The dielectric filter 100 is provided with a second feed blind hole 110. The two first feed blind holes 220 and the second feed blind hole 110 are disposed on the lower surface of the circular filter assembly.

Further, as shown in FIG. 2, the dielectric filter 100 includes two first resonant cavities, two second resonant cavities, a first T-shaped through groove 120, and a first coupling hole 130. The two first resonant cavities and the two second resonant cavities are respectively located at two ends of the dielectric filter 100. The two second resonant cavities are located at an end away from the cascade matching window 300. The first T-shaped through groove 120 includes a first through groove 121 and a second through groove 122. The second through groove 122 separates the two first resonant cavities. The first through groove 121 separates the first resonant cavity and the second resonant cavity. An end of the second through groove 122 is connected to the first through groove 121. The first coupling hole 130 is located between the two second resonant cavities. The same upper surface of each of the first resonant cavity and the second resonant cavity is provided with a tuning blind hole 140.

Further, as shown in FIG. 2, the dielectric filter 100 further includes one second T-shaped through groove 150 and two third resonant cavities. The second T-shaped through groove 150 is located between the first T-shaped through groove 120 and the first coupling hole 130. The second T-shaped through groove 150 includes a third through groove 151 and a fourth through groove 152. The third through groove 151 and the first through groove 121 are disposed in parallel. The fourth through groove 152 and the second through groove 122 are disposed in parallel. The fourth through groove 152 is used for separating the two third resonant cavities. The third resonant cavity 151 separates the third resonant cavity and the second resonant cavity. The second feed blind hole 110 is located in the lower surface of the third resonant cavity.

Specifically, when a signal is inputted from an end portion 210 of the dielectric waveguide circulator 200 shown in FIG. 2, the signal sequentially passes through, from the end portion 210 connected to the dielectric filter 100 in a direction opposite to the direction shown by the arrow in FIG. 2, two first resonant cavities, one third resonant cavity, two second resonant cavities, and the third resonant cavity provided with the second feed blind hole 110 to be outputted to form a circle. When the signal is inputted from the second feed blind hole 110, the signal is outputted to the dielectric waveguide circulator 200 from the dielectric filter 100 in the direction shown in FIG. 2.

Further, the second coupling holes 160 are provided at two ends of the third through groove 151 of the second T-shaped through groove 150.

Further, an outer edge of each of the first feed blind hole 220 and the second feed blind hole 110 is provided with an electrode metal layer 230. The electrode metal layer 230 has a width set to 0.3 mm. The electrode metal layer 230 is connected to a corresponding metallized area of the first feed blind hole 220 or the second feed blind hole 110.

Further, a non-metallized area 240 is further disposed at an outer edge of the electrode metal layer 230, to further reduce the risk that the dielectric filter 100 or the dielectric waveguide circulator 200 contacts a PCB.

Further, the dielectric waveguide circulator 200 is provided with two matching steps 250 and a mounting blind hole 260. The two matching steps 250 are respectively disposed on an upper surface and a lower surface of the dielectric waveguide circulator 200. The matching step 250 is provided with three recesses provided corresponding to the end portions of the dielectric waveguide circulator 200. The recesses are circumferentially provided around the mounting blind hole 260. Two adjacent recesses are in communication with each other to form a Y shape the same as the outer contour of the dielectric waveguide circulator 200. The mounting blind hole 260 is used for mounting a magnetic assembly 400.

Further, as shown in FIG. 4, the circular filter assembly further includes a magnetic assembly 400. The magnetic assembly 400 includes a ferrite substrate 410, a samarium-cobalt magnet 420, and a cover plate 430 arranged sequentially. The cover plate 430 is farther away from a bottom of the mounting blind hole 260 with respect to the ferrite substrate 410. The cover plate 430 is detachably disposed on the mounting blind hole 260.

In the description of the specification, the description with reference to terms "an embodiment", "some embodiments", "exemplary embodiments", "an example", "a specific example" or "some embodiments", and the like indicate that specific features, structures, materials or characteristics described with reference to the embodiments or examples are included in at least one embodiment or example of this application. In the description, the schematic descriptions of the foregoing terms do not necessarily involve the same embodiments or examples. In addition, the described specific features, structures, materials or characteristics may be combined in an appropriate manner in any one or more embodiments or examples.

Although the embodiments of the present application have been shown and described above, a person of ordinary skill in the art may understand that various changes, modifications, replacements, and variations may be made to these embodiments within the principle and concept of the present application, and the scope of the present application is as defined by the appended claims and equivalents thereof.

The embodiments of the present application are described above in detail with reference to the accompanying drawings. However, the present application is not limited to the foregoing embodiments. Within the knowledge of a person of ordinary skilled in the art, various changes may further be made without departing from the protection scope of the present application.

What is claimed is:

1. A circular filter assembly, comprising:

a dielectric filter; and a dielectric waveguide circulator provided with at least three end portions, wherein an end of the dielectric filter is connected to one of the end portions, a cascade matching window is disposed at a connection between the dielectric filter and the end portion, and the cascade matching window is used for adjusting impedance of the circular filter assembly; and the dielectric waveguide circulator and the dielectric filter are integrally formed.

2. The circular filter assembly of claim 1, wherein the dielectric waveguide circulator and the dielectric filter are obtained through integral formation by a dry pressing process or an injection process and then subjected to metallization.

3. The circular filter assembly of claim 1, wherein the dielectric waveguide circulator is provided with a matching step and a mounting blind hole, the matching step is disposed on a surface of the dielectric waveguide circulator, and the matching step is provided with a plurality of recesses provided corresponding to the end portions of the dielectric waveguide circulator; the recesses are circumferentially provided around the mounting blind hole; and the mounting blind hole is used for mounting a magnetic assembly.

4. The circular filter assembly of claim 3, wherein two adjacent recesses are in communication with each other.

5. The circular filter assembly of claim 1, wherein each of the other two end portions of the dielectric waveguide circulator is provided with a first feed blind hole, and the dielectric filter is provided with a second feed blind hole; and the two first feed blind holes and the second feed blind hole are disposed on the same surface or different surfaces of the circular filter assembly.

6. The circular filter assembly of claim 5, wherein the dielectric waveguide circulator is provided with a matching step and a mounting blind hole, the matching step is disposed on a surface of the dielectric waveguide circulator, and the matching step is provided with a plurality of recesses provided corresponding to the end portions of the dielectric waveguide circulator; the recesses are circumferentially provided around the mounting blind hole; and the mounting blind hole is used for mounting a magnetic assembly.

7. The circular filter assembly of claim 5, wherein the dielectric waveguide circulator and the dielectric filter are obtained through integral formation by a dry pressing process or an injection process and then subjected to metallization.

8. The circular filter assembly of claim 5, wherein the dielectric filter comprises two first resonant cavities, two second resonant cavities, a first T-shaped through groove, and a first coupling hole, the two first resonant cavities and the two second resonant cavities are respectively located at two ends of the dielectric filter, and the two second resonant cavities are located at an end away from the cascade matching window; the first T-shaped through groove comprises a first through groove and a second through groove, and the second through groove separates the two first resonant cavities; the first through groove separates the first resonant cavity and the second resonant cavity; an end of the second through groove is connected to the first through groove; the first coupling hole is located between the two second resonant cavities, and the same first surface of each of the first resonant cavity and the second resonant cavity is provided with a tuning blind hole; and the circular filter assembly is provided with a second surface opposite to the first surface, and the second feed blind hole is located in the second surface.

9. The circular filter assembly of claim 8, wherein the dielectric waveguide circulator is provided with a matching step and a mounting blind hole, the matching step is disposed on a surface of the dielectric waveguide circulator, and the matching step is provided with a plurality of recesses provided corresponding to the end portions of the dielectric waveguide circulator; the recesses are circumferentially provided around the mounting blind hole; and the mounting blind hole is used for mounting a magnetic assembly.

10. The circular filter assembly of claim 8, wherein the dielectric waveguide circulator and the dielectric filter are obtained through integral formation by a dry pressing process or an injection process and then subjected to metallization.

11. The circular filter assembly of claim 8, wherein the dielectric filter further comprises a second T-shaped through groove and two third resonant cavities; the second T-shaped through groove is located between the first T-shaped through groove and the first coupling hole; the second T-shaped through groove comprises a third through groove and a fourth through groove; the third through groove and the first through groove are disposed in parallel; the fourth through groove and the second through groove are disposed in parallel; the fourth through groove is located between the two third resonant cavities; and the third through groove is located between the third resonant cavity and the second resonant cavity.

12. The circular filter assembly of claim 11, wherein the dielectric waveguide circulator is provided with a matching step and a mounting blind hole, the matching step is disposed on a surface of the dielectric waveguide circulator, and the matching step is provided with a plurality of recesses provided corresponding to the end portions of the dielectric waveguide circulator; the recesses are circumferentially provided around the mounting blind hole; and the mounting blind hole is used for mounting a magnetic assembly.

13. The circular filter assembly of claim 11, wherein the dielectric waveguide circulator and the dielectric filter are obtained through integral formation by a dry pressing process or an injection process and then subjected to metallization.

14. The circular filter assembly of claim 11, wherein second coupling holes are provided at two ends of the third through groove of the second T-shaped through groove.

15. The circular filter assembly of claim 14, wherein the dielectric waveguide circulator is provided with a matching step and a mounting blind hole, the matching step is disposed on a surface of the dielectric waveguide circulator, and the matching step is provided with a plurality of recesses provided corresponding to the end portions of the dielectric waveguide circulator; the recesses are circumferentially provided around the mounting blind hole; and the mounting blind hole is used for mounting a magnetic assembly.

16. The circular filter assembly of claim 14, wherein the dielectric waveguide circulator and the dielectric filter are obtained through integral formation by a dry pressing process or an injection process and then subjected to metallization.

17. The circular filter assembly of claim 14, wherein an outer edge of each of the first feed blind hole and the second feed blind hole is provided with an electrode metal layer;

and the electrode metal layer is connected to a corresponding metallized area of the first feed blind hole or the second feed blind hole.

18. The circular filter assembly of claim 17, wherein the dielectric waveguide circulator is provided with a matching step and a mounting blind hole, the matching step is disposed on a surface of the dielectric waveguide circulator, and the matching step is provided with a plurality of recesses provided corresponding to the end portions of the dielectric waveguide circulator; the recesses are circumferentially provided around the mounting blind hole; and the mounting blind hole is used for mounting a magnetic assembly.

19. The circular filter assembly of claim 17, wherein the electrode metal layer has a width set to 0.3 mm to 1 mm.

20. The circular filter assembly of claim 19, wherein the dielectric waveguide circulator is provided with a matching step and a mounting blind hole, the matching step is disposed on a surface of the dielectric waveguide circulator, and the matching step is provided with a plurality of recesses provided corresponding to the end portions of the dielectric waveguide circulator; the recesses are circumferentially provided around the mounting blind hole; and the mounting blind hole is used for mounting a magnetic assembly.

* * * * *